Figure 3:
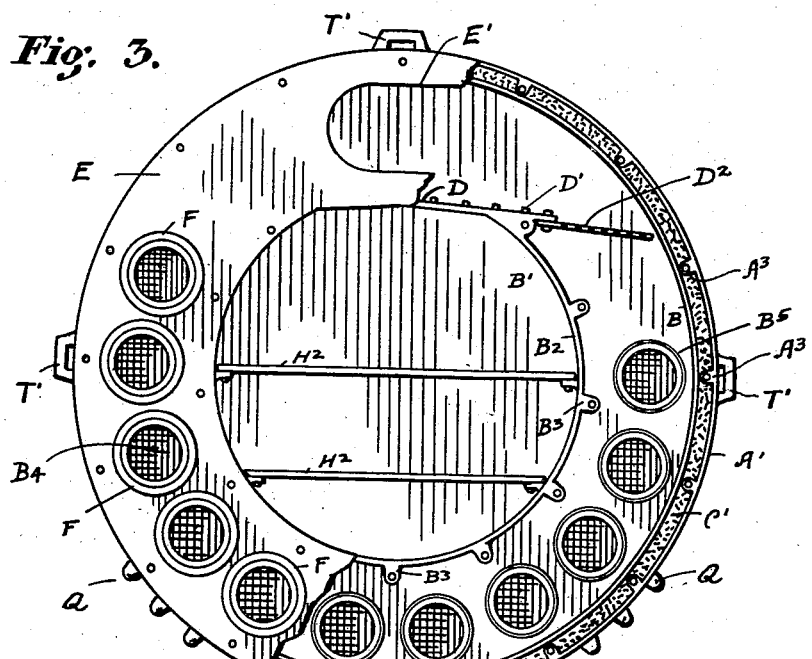

P. STAUF.
COOLER.
APPLICATION FILED NOV. 25, 1910.
1,017,478.
Patented Feb. 13, 1912.
2 SHEETS—SHEET 1.
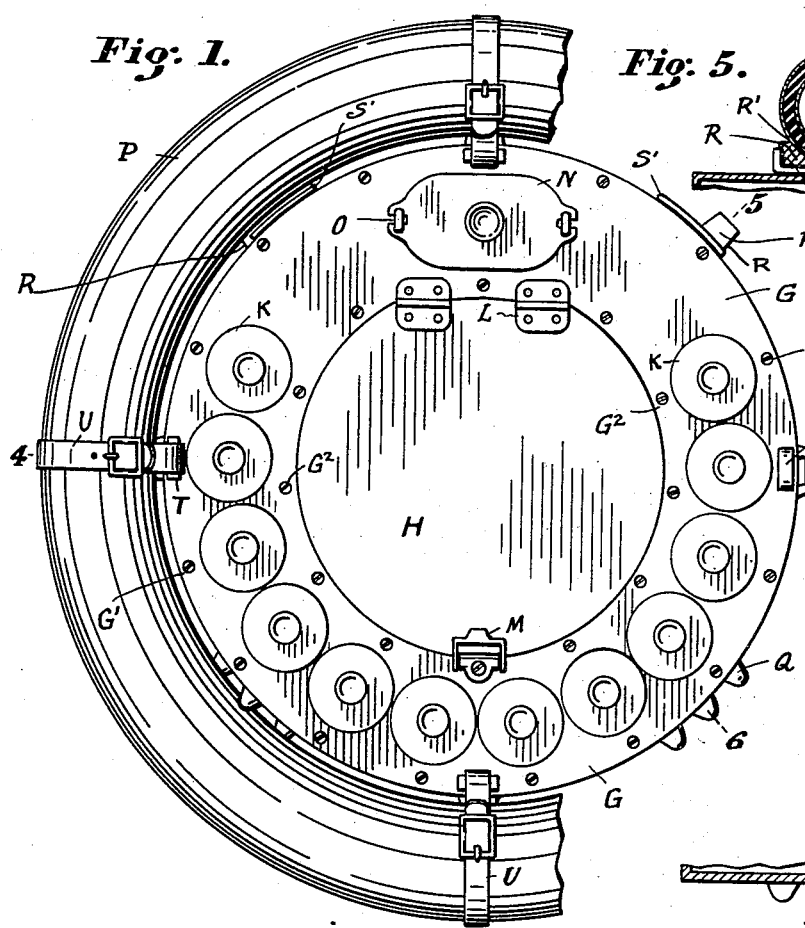
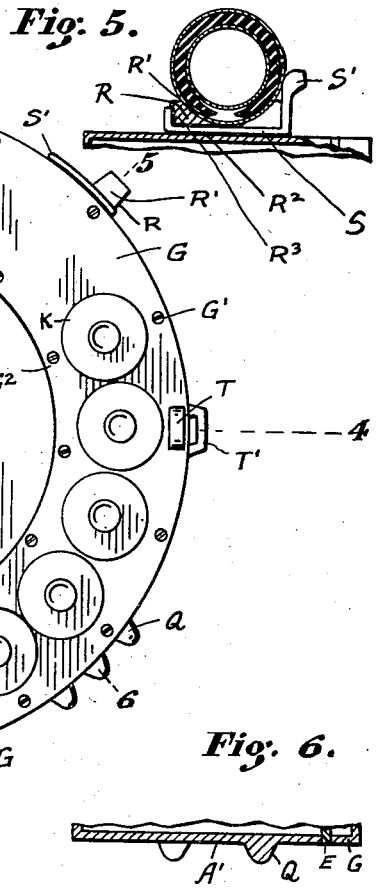
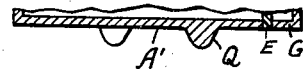
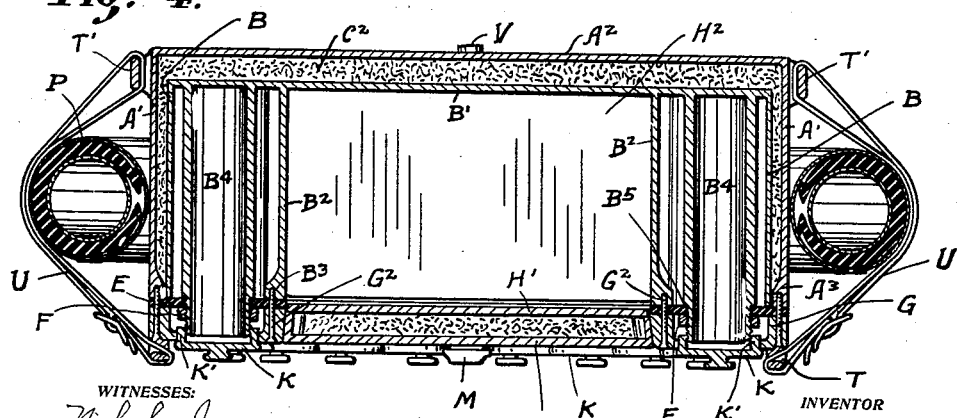
WITNESSES:
Nicholas Jensma
Linas P. Roberts
INVENTOR
PHILIP STAUF,
BY Thomas L Ryan
ATTORNEY

P. STAUF.
COOLER.
APPLICATION FILED NOV. 25, 1910.

1,017,478.

Patented Feb. 13, 1912.

2 SHEETS—SHEET 2.

WITNESSES:
Nicholas Jensma
Linas P. Roberts

INVENTOR
PHILIP STAUF,
BY
Thomas L. Ryan
ATTORNEY

UNITED STATES PATENT OFFICE.

PHILIP STAUF, OF MUNCIE, INDIANA.

COOLER.

1,017,478. Specification of Letters Patent. Patented Feb. 13, 1912.

Application filed November 25, 1910. Serial No. 594,210.

*To all whom it may concern:*

Be it known that I, PHILIP STAUF, a citizen of the United States, and residing at Muncie, in the county of Delaware and State of Indiana, have invented certain new and useful Improvements in Coolers, of which the following is a specification.

This invention relates to improvements in food coolers or containers intended to be carried by automobiles, and has especial reference to a type of container recently brought out and which is adapted to be supported by the fifth or carried tire of the automobile.

The objects of my invention are to provide such construction in a container of this class that the space occupied by same will be utilized economically; that the food contents of the container may be preserved in a sanitary, cooled and edible condition, and the device will be durable, easy and convenient to use, and which will be capable of being held securely in removable or detachable engagement with the carried tire.

My present invention is embodied in and its objects are accomplished by the new construction, combination and arrangement of parts, and the novel features and details of construction, described in the following specification, defined in the appended claims, and illustrated in the accompanying drawings.

The several parts of the invention, as shown in the different views in the drawings, are identified by similar characters of reference.

Figure 2:
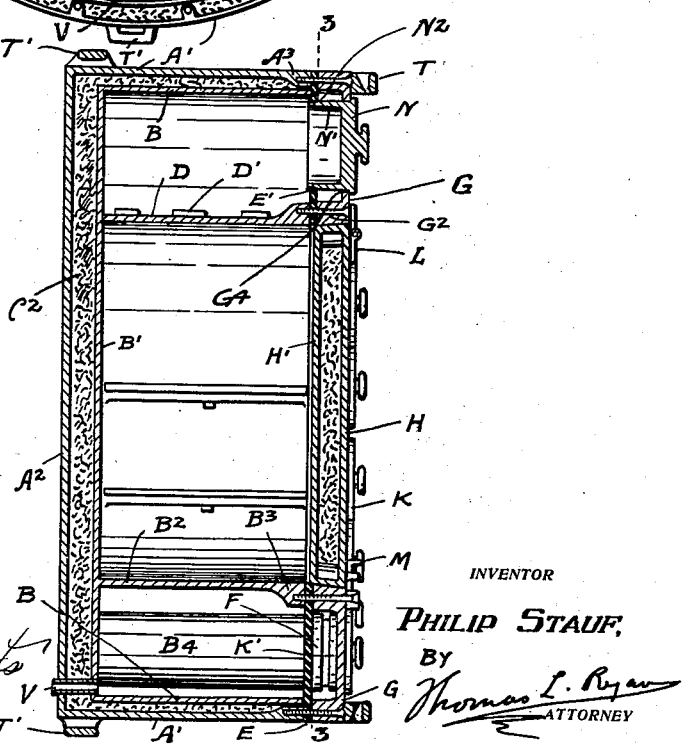

In the drawings—Figure 1 is a front view of my improved food cooler, a sufficient portion of the tire being shown to illustrate the function performed by it, and to show the manner of fastening the cooler into engagement with the tire. Fig. 2 is a vertical transverse central sectional view of Fig. 1, the tire being not shown. Fig. 3 is a front view taken on the line 3—3 in Fig. 2, the face ring having been removed and a portion of the packing ring being broken away. Fig. 4 is a horizontal transverse sectional view taken on the line 4—4 in Fig. 1. Fig. 5 is a sectional view taken on the line 5 of Fig. 1 of a portion of the body wall, and showing the lock-bar in raised position. Fig. 6 is a sectional view taken on the line 6 of Fig. 1 of a portion of the body wall and showing the location of the studs Q.

The main or outer body of my improved food cooler consists of a cylindrical shell made of suitable material such as wood fiber, or it may be made of metal of light weight such as aluminum. The frontal edge of the annular wall $A^1$ is machined smooth and is provided with a series of lugs $A^3$, each of which has a threaded hole. An inner body, cylindrical in form and made of suitable composition or metal is of such depth and diameter that when supported in position, there will be a space $C^1$ and $C^2$ between the wall B and the back $B^1$ of the inner body, and the wall $A^1$ and the back $A^2$ of the outer body, respectively. These spaces are filled with insulating material such as mineral wool or asbestos. The frontal edges of the wall B and of the partition $B^2$ of the said inner body are machined smooth, and provided at the edge of the partition $B^2$ are lugs $B^3$ each of which has a threaded hole. The top portion of the partition $B^2$ is of straight form and slopes downwardly from each side of the center and forms the floor D. The space between this floor and the wall B constitutes a chamber in which is retained a suitable quantity of ice. Studs or plates $D^1$ on the floor D will serve to hold the ice in place. The ends $D^2$ of this floor are made of sheet metal perforated, or they may be made of netting. Formed integral with the said inner body is a series of receptacles $B^4$, tubular in cross section. The open end of these receptacles is of a diameter slightly less than that of the receptacle and is threaded. The shoulder $B^5$ is in alinement with the front edges of the walls $A^1$, B and partition $B^2$.

E designates a partition or packing ring. The function of this ring is to seal the space between the walls $A^1$ and B and between the walls $B^2$ and the walls $B^4$, and it may be made of wood fiber, papier mâché or other suitable material. The edges of this packing ring have holes therein spaced so as to register with the threaded holes in the lugs $A^3$ and $B^3$, and suitable holes which register with the threaded ends of the tubular receptacles, will admit of the placement of the packing ring to the position as shown in the drawing, reference being had more especially to Fig. 3. The packing ring having been so placed in position, the flange rings F are screwed down and a tight closure at the shoulders $B^5$ is effected. At the upper central portion of this packing ring E is provided an aperture $E^1$ which I will designate as the main opening, and the function of which will be presently referred to.

The member which forms the frontal portion of the main body and which constitutes a support for the door H and the cap closures K, for the receptacles is the cast metal face ring G. This annular face ring is substantially U-shaped in cross section, as shown in the drawings, and is provided with holes at its outer and inner edges through which screws $G^1$ may be passed and screwed into threaded holes in the lugs $A^3$ and $B^3$. When the cap screws $G^1$ are screwed down, the face ring is tightened against the outer edge of the packing ring, and when the screws $G^2$ are screwed down, the face of the wall B and of the wall $B^2$ are drawn to a sealed contact with the underside of the packing ring, and the face ring G will be held securely in position.

Provided for each of the tubular receptacles is a cap K. Each of these caps is internally threaded to fit the threaded end of the receptacle and when screwed down into the position as shown in Fig. 4, the flanges $K^1$ will have passed through suitable openings provided therefor in the face ring, and the rims of the caps will tighten against the face ring. An aperture $G^4$ in the upper portion of this face ring and which may be designated as the main opening is located as to aline with the similar main opening hereinbefore referred to in the packing ring.

The door H, swung on the hinges L, and which forms a closure for the food compartment has its edges beveled to fit a similarly beveled opening in the face ring. This door is of hollow formation and its interior portion of insulating material will be held in place by a back plate $H^1$. M designates a suitable lock or latch. The shelves $H^2$ afford suitable supports for the food packages or parcels to be stored in the food compartment.

N designates a lid for the ice chamber. The structure of this lid is clearly shown in Fig. 1 and Fig. 2. The flange $N^1$ is of such form that it may pass through the opening $G^4$ in the upper part of the face ring, and the shoulder $N^2$ will press against the edge of the opening $E^1$ in the packing ring. When in the closed position as shown, the buttons O are turned to the position illustrated in Fig. 1 and the lid will be held securely closed.

As before stated, this improved food cooler is intended to be held in position inside of the tire P. To afford facility whereby it may be placed in and secured at such position easily and with despatch construction and arrangement of parts may be provided. Provided on the external face of the wall $A^1$ are the studs Q arranged as shown in Fig. 3 and in Fig. 6. At locations toward the upper portion of the body and on the external face of the wall $A^1$ are lugs R having curved faces $R^1$. $R^2$ designates a hole that extends transversely through said lug and which hole terminates at the rear side of said lug in the form of a recess $R^3$. The stem S which terminates at the front in the form of an arm $S^1$ having a face of curvature to conform substantially to that of the tire, is free to move in the hole $R^2$, so as to lie in the flat inoperative position as shown in Fig. 1, or in the upright or operative position as shown in Fig. 5. It will be observed that four of the screws $G^1$, as plainly shown in Figs. 1 and 2, have peculiarly formed heads. These heads constitute the eyes T. $T^1$ and $T^1$ designate eyes of similar shape formed integral with and at the rear edge of the wall $A^1$. Through these eyes are passed the leather straps U. It is obvious that eyes may be provided for additional straps U, if deemed desirable.

V designates an outlet that extends from the lower portion of the space between the walls $A^1$ and B, and the outside of the wall $A^2$.

To place my improved cooler into position and actual engagement with the tire, the arms $S^1$ are laid into flat position. The cooler is then disposed to position; the studs Q will engage the surface of the tire, as will also the lugs R. The arms $S^1$ are then moved to the upright position shown in Fig. 5. The effect of this engagement of the arm with the tire is to urge the latter forwardly, the end portion of the stem being drawn into the recess $R^3$. The arms being held in this position, the cooler will be sustained in tightened engagement with the tire. Straps U carried by the eyes $T^1$ are drawn through the eyes T and are tightened into contact with the outer face of the tire. With the cooler so connected to the tire, the latter becomes substantially a part of the device,—that is to say,—it constitutes a resilient support for said cooler, the utility of which is obvious. The cooler having been installed in position and the desired quota of ice deposited on the floor D, the lid N is then secured. The studs $D^1$ on the floor will hold the ice in place. The perforated or openwork ends $D^2$ of the floor will permit of free atmospheric circulation from the ice compartment and throughout the space between the inner and outer body; the water shed from the floor D will pass through the ends $D^2$ and will bathe the surfaces of the walls B and $B^2$, and the walls $B^4$. The water may be discharged through the outlet V. The advantages afforded by the tubular receptacles, arranged as shown, are several. Food and drink containers made of fragile material such as glass, or of paper or board, will be carried without danger of breakage or mutilation. The ice chamber and cooling space being sealed, and the compartment and receptacles each having individual closures, there is comparatively a very small portion of the cool interior of the structure exposed to the outside air, when the provisions are being removed from or placed in the cooler.

It is obvious that the cooler may be loaded with ice and provisions at a time before as well as after it is placed in position in the tire. The cooler being capable of being attached to any standard form of tire, it is contemplated that it may be supplied as an accessory for automobiles.

While it is thought that metal is the material most practicable for the inner body and for the face ring, it is contemplated that the outer body, and the door, caps, and lid may be made of pressed paper, or leather fiber, or wood fiber, or other similar composition.

What I claim as my invention, and desire to secure by Letters Patent, is—

1. A container of the kind described, comprising a hollow body having an internal concentric partition to form a central compartment and a space between the outer wall and the partition, one end of said hollow body being open, receptacles disposed in said space and having open forward ends and being exteriorly shouldered near said forward ends, an annular packing ring to close said space between the wall and said partition and the ends of said receptacles and extending outside of the said wall, said hollow body having its frontal face to register with the said packing ring, a face ring, means to draw the face ring and the faces of the partition, and of the inner and outer wall into tight contact with the packing ring, means to draw the edges of the packing ring into contact with the shoulders of the said receptacles, a door carried by the face ring to form a closure for said central compartment, and a main opening through the upper portion of the face ring and of the packing ring.

2. A container of the kind described, comprising a hollow body having a concentric partition to form a central compartment and a space between the outer wall and the partition one end of said hollow body being open, receptacles formed integral with the rear side of said body and located in said space and having their forward ends shouldered, an annular packing ring to close said space between the wall and said partition and the shouldered ends of said receptacles and extending outside of said wall and being provided with a main opening therein, foraminous partitions in said space and located above said receptacles, a hollow outer body having its face to register with the inner face of said packing ring, a face ring having openings therein to register with the open ends of said receptacles and being provided with a main opening located to register with the main opening in the packing ring, means to draw the face ring and the face of the partition and the faces of the inner and outer walls into tight contact with the packing ring, means to draw the edges of the packing ring into contact with the shouldered ends of the receptacles, a door carried by the face ring to form a closure for said central compartment, a closure to close the space between the main opening of the face ring and that of the packing ring, a lid for said opening, and cap closures for said receptacles.

3. A container of the kind described, comprising a hollow body having an internal concentric partition to form a central compartment and a space between the outer wall and the partition, one end of the said hollow body being open, receptacles disposed in said space and having open forward ends and being exteriorly threaded near said forward ends, an annular packing ring to close said space between the wall and the said partition and the ends of said receptacles, a face ring having openings therein to register with the open ends of said receptacles and being provided with a main opening located to register with the main opening in the packing ring, means to draw the face ring and the faces of the partition and of the outer wall into tight contact with the packing ring, an insulating covering for the outer wall, means to draw the edges of the packing ring into contact with the shoulders of said receptacles, a door for said central compartment, and a closure to close the space between the main opening of the face ring and that of the packing ring, and a lid for said opening.

4. A container of the kind described, comprising a hollow body having an internal concentric partition to form a central compartment and a space between the outer wall and the partition, one end of the said hollow body being open, receptacles disposed in said space and having shouldered forward ends, an annular packing ring to close said space between the wall and the said partition and the ends of said receptacles, a face ring, means to draw the face ring and the faces of the partition and of the outer wall into tight contact with the outer wall, means to draw the edges of the packing ring into contact with the shouldered ends of said receptacles, an insulating covering for said outer wall, and cap closures for said receptacles.

5. A container of the kind described, comprising a hollow body having a concentric partition to form a central compartment and a space between the outer wall and the partition one end of the said hollow body being open, receptacles formed integral with the rear side of said body and located in said space and having their forward ends shouldered, an annular packing ring to close said space between the wall and said partition and the shouldered ends of said receptacles and extending outside of said wall and being provided with a main opening therein, foraminous partitions in said space and located above said receptacles, a hollow outer body having its face to register with the said packing ring, insulating material between the hollow outer body and the aforesaid inner body, a face ring having openings therein to register with the open ends of said receptacles and being provided with a main opening located to register with the main opening in the packing ring, bolts to draw the face ring and the face of the partition and the faces of the inner wall and outer wall into tight contact with the packing ring, means to draw the edges of the packing ring into contact with the shouldered ends of the receptacles, a door to form a closure for the said central compartment, a closure to close the space between the main opening of the face ring and that of the packing ring, a lid for said opening, cap closures for the receptacles.

In testimony whereof I affix my signature in presence of two witnesses.

PHILIP STAUF.

Witnesses:
 THOMAS B. PARKISON,
 CHARLES M. BECKETT.

Copies of this patent may be obtained for five cents each, by addressing the "Commissioner of Patents, Washington, D. C."